Patented June 24, 1947

2,422,699

UNITED STATES PATENT OFFICE 2,422,699

DEFECATION OF SUGAR SOLUTIONS

John J. Naugle, New York, N. Y., assignor of two-fifths to Andres Bay Trading Corporation, New York, N. Y., a corporation of New York, and two-fifths to Cuban Dominican Sales Corporation, New York, N. Y., a corporation of New York No Drawing. Application July 3, 1944,
Serial No. 543,423

2 Claims. (Cl. 127—50)

My present invention relates to the treatment of sugar solutions, and more particularly, to the purification, decolorization and deodorization of cane and other sugar-bearing plant juices, raw sugar melts and washed raw sugar melts.

Clarification of the above referred to solutions has heretofore been accomplished by defecation with lime, but I have found that such treatment has certain disadvantages attendant thereto. For example, the degree to which the colloidal materials, gums, waxes, and color and odor-imparting substances can be removed leaves much to be desired; the temperature to which the solution must be raised to carry out the treatment is such as to cause undue darkening; the normal ash content of the solution is increased; and the muds thereof have a low filtration rate.

It is, therefore, the purpose of my present invention to overcome the foregoing disadvantages, and provide a double defecation process whereby a clear, brilliant, extremely light colored and substantially odorless sugar solution, of fine flavor, may be obtained from cane and other sugar-bearing plant juices, raw sugar melts, or washed raw sugar melts; said process thoroughly removing from the starting material the impurities above enumerated, and this, without adding to the ash content thereof, and in a manner which greatly improves the filtration rate of the muds.

These, and other objects and advantages of my present invention, which will become obvious as the detailed description thereof progresses, are attained thereby in the following manner:

To the starting material, which, as indicated, may be cane or other sugar-bearing plant juice, a raw sugar melt, or a washed raw sugar melt, I add from about 1% to about 3%, based on the weight of the total sugar solids in said starting material, of a combination of the oxide and hydroxide of an alkaline-earth metal, for example, magnesium. I have found that, for the purposes of this invention, light magnesium oxide containing from about 1% to about 35%, usually about 2%, of magnesium hydroxide, and not more than 1% of chloride, expressed as sodium chloride, is particularly effective. The amount of the oxide-hydroxide mixture added should be sufficient to raise the pH of the solution to from about 9.7 to about 10.00. The amount of the hydroxide which can be tolerated in the defecant will vary with different starting liquors, and with the degree of purity required of the end product.

The mixture is added dry to permit better control over the relative proportions of the components thereof, and, because the oxide readily takes up water, the material should, preferably, be freshly prepared immediately before using.

While not limited thereto, I prefer to prepare the mixture by calcining the hydroxide of the metal for about 30 minutes at about 400° C. The dehydration should not be permitted to go to the end point, but should be of such duration as will result in residual hydroxide in an amount, as above stated, depending upon the purity required of the end product.

The sugar solution should be at room temperature during the addition of the oxide-hydroxide mixture and, after well stirring, the solution is heated to from about 77° to about 79° C. Higher temperatures result in darkening of the solution, and the formation of a finer precipitate, which does not filter well.

The heated solution is then settled and decanted, the precipitate being flocculent and bulky. The muds are filtered, and the resulting filtrate is added to the clear liquid obtained from the decanting. The first defecation is now complete.

The pH of this solution is about 10.00, or slightly below, and it is necessary to reduce the same to from about 7.0 to about 7.3. It is also necessary to precipitate impurities from the solution, for example, as phosphates or other insoluble compounds. For these purposes, the second defecation is resorted to. A 10% phosphoric acid solution, or any other solution suitable for lowering the pH and producing insoluble precipitates, is added until a pH within the range indicated is reached, and, after heating to about 83° C., the solution is permitted to settle. The clear solution is drawn off, and the muds are filtered. Here again, the precipitate is flocculent, but not quite as bulky as that resulting from the first defecation, and the filtration rate is high. The second defecation is now complete.

The end product of the above described process is a purified, clear, brilliant, light straw solution, without undesirable odor, and having a fine flavor.

It will be noted that the process is simple and inexpensive to practice, and it results in a product which is superior to any heretofore attained, particularly by lime defecation.

This completes the description of my process for obtaining a highly purified, decolorized and deodorized sugar solution from cane and other sugar-bearing plant juices, raw sugar melts, or washed raw sugar melts. It is, however, to be clearly understood that the foregoing description is merely illustrative, and I do not wish to be limited to the exact details herein set forth, inasmuch as changes may be made therein without the exercise of invention and within the true spirit and scope of the claims hereto appended.

Other objects and advantages of the process of my present invention will readily occur to those skilled in the art to which the same relates.

I claim:

1. The method of purifying, decolorizing and deodorizing a sugar solution which includes the steps of: adding to said solution a sufficient quantity of a mixture of the oxide and hydroxide of magnesium to bring the pH of said solution to from about 9.7 to about 10.00; the hydroxide constituting from about 1% to about 35% of the mixture; heating said solution to from about 77 degrees to about 79 degrees C.; removing therefrom the resulting precipitate; and thereafter adjusting the pH of the clear solution substantially to neutrality.

2. The method of purifying, decolorizing and deodorizing a sugar solution which includes the steps of: adding to said solution a sufficient quantity of a mixture of the oxide and hydroxide of magnesium to bring the pH of said solution to from about 9.7 to about 10.00; heating said solution to from about 77° to about 79° C.; removing therefrom the resulting precipitate; adding phosphoric acid to said solution to adjust the pH thereof to from about 7.0 to about 7.3; heating said solution to about 83° C.; and removing from said solution the resulting precipitate.

JOHN J. NAUGLE.

REFERENCES CITED

The following references are of record in the file of this patent:

UNITED STATES PATENTS

| Number | Name | Date |
|---|---|---|
| 518,538 | Tiemann | Apr. 17, 1894 |
| 517,820 | Kolbig | Apr. 3, 1894 |
| 1,052,113 | Wiese | Feb. 4, 1913 |
| 1,233,919 | Rogan | July 17, 1917 |
| 2,071,776 | Teatini | Feb. 23, 1937 |
| 2,340,128 | Kent | Jan. 25, 1944 |

FOREIGN PATENTS

| Number | Country | Date |
|---|---|---|
| 190 | Great Britain | 1877 |

OTHER REFERENCES

Sugar Cane, 1894, page 274.